United States Patent

[11] 3,543,916

[72] Inventor Edward J. Berk
 Chicago, Illinois
[21] Appl. No. 759,688
[22] Filed Sept. 13, 1968
[45] Patented Dec. 1, 1970
[73] Assignee Westinghouse Air Brake Company
 Pittsburgh, Pennsylvania
 a corporation of Pennsylvania

[54] FLOW DIVERTING SHAKER CONVEYOR TROUGH
 3 Claims, 8 Drawing Figs.
[52] U.S. Cl. .................................................. 198/220,
 198/188
[51] Int. Cl. .................................................. B65g 27/04
[50] Field of Search .......................................... 198/68, 74,
 188, 59, 220(A10), 220(B10)

[56] References Cited
UNITED STATES PATENTS
588,297 8/1897 Thompson .................. 198/220(B-10)
FOREIGN PATENTS
668,003 3/1953 Great Britain ................ 198/188

Primary Examiner—Hugo O. Schulz
Attorney—John E. McRae

ABSTRACT: A shaker conveyor trough with a diverting gate for selectively diverting conveyed material through an opening in the trough wall when the gate is in diverting position. Gate blocks flow through the opening in an alternate, closed position. Power means such as a cylinder and piston may be used to move the gate between operative positions.

Patented Dec. 1, 1970

INVENTOR.
Edward J. Berk
BY
Murray A. Gleeson
ATTORNEY

INVENTOR.
Edward J. Berk
BY
Murray A. Gleeson
ATTORNEY 3,543,916

FLOW DIVERTING SHAKER CONVEYOR TROUGH

BACKGROUND OF THE INVENTION

The field of the present invention is a reciprocating type conveyor commonly called a shaker or vibratory conveyor and is characterized by an elongated trough to which a reciprocable conveying motion is imparted for moving material lengthwise of it. Reciprocating conveyors conventionally discharge at the outbye end, material simply running out the end into another conveyor or use point at a lower level. No commercially successful side discharge shaker conveyors have been available prior to the present invention despite the obvious advantages in low head room environments.

One recently developed use for heavy duty shaker conveyors is the handling of sand and castings, and other materials, in foundries and industrial plants where said discharge of the conveyed material is required at intermediate points along the conveyor. For example, in a glass-reclaiming plant, where cullet is carried by a shaker conveyor along a line of melting furnaces and it is necessary to divert the said material to one furnace or another, or a combination of furnaces simultaneously, from time to time. The problem of feeding a number of such use points along a shaker conveyor trough has not been solved satisfactorily heretofore because of the difficulty of moving material sidewise from a trough which is powered for longitudinal conveying movement.

BRIEF SUMMARY OF INVENTION

Accordingly, a general object of the present invention is to provide a flow diverting shaker conveyor trough in which part or all of the material conveyed may be diverted selectively through an opening in the trough wall intermediate the ends of the conveyor.

A specific object is the provision of a shaker conveyor trough with a diverting gate movable by power between closed and diverting positions respectively blocking and enabling flow of material from the trough channel through an opening wall of the trough.

Another object is to dispose the diverting gate, when in diverting position, obliquely relatively to the direction of material flow in the trough channel and relative to the opening for enabling longitudinal shaker motion to divert material efficiently, sidewise, from the channel through the opening.

Other objects and advantages will be apparent from the following description taken in connection with the drawings in which:

FIG. 5 is a fragmentary enlarged perspective view of FIG. 1 showing that part of the shaker conveyor with which FIGS. 3 and 4 are concerned;

Figure 6:
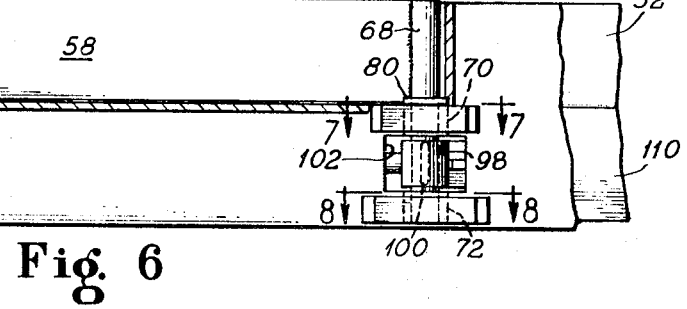
FIG. 6 is a fragmentary enlarged view of FIG. 1 taken along the line 6–6.
Figure 7:
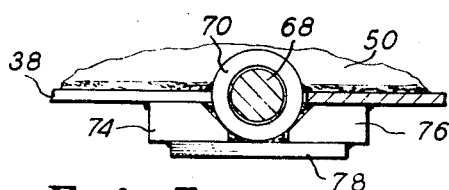
Figure 8:
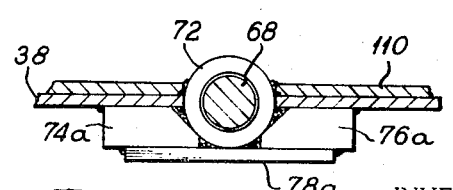

FIGS. 7 and 8 are fragmentary enlarged views of FIG. 6 taken respectively along the lines 7–7 and 8–8.

Like parts are referred to by like reference characters throughout the FIGS. of the drawings.

A flow diverting shaker conveyor generally designated 10 comprises a receiving end trough section 12 and intermediate trough sections 14, 16, 18 and 20 bolted together at flanged joints 22 to form an elongated, upwardly open, material conveying channel 24 defined by upstanding marginal side walls flanking a bottom wall or floor. The trough sections are supported for reciprocable conveying movement on a series of rollers 26 engaging tracks 28 on the undersides of the trough sections. The rollers are mounted on posts 30 some of which are tied together by rails 32.

A shaker conveyor drive unit 34 is connected to drive trough section 14 by puller rod 36. It imparts reciprocable conveying motion to the entire shaker conveyor line to move material in the direction of the arrows, that is to the right in FIGS. 1 and 2. The drive unit 34 might be conventional, for example as disclosed in U.S. Pat. No. 2,029,133.

Means for diverting conveyed material through one or more of the side walls is shown for each of the trough sections 16, 18, and 20.

Sidewall 38 of trough section 16 is provided with an opening 40 leading via side chute 42 to a cross conveyor 44 which in this instance is at a lower level, but is not necessarily so. One of the advantages of the present invention is that the conveyor 44 can be at the same level as the shaker conveyor 10 if head room so requires. A diverting gate 46 hinged in the side wall at 48, is swingable between a solid line closed position flush with wall 38, and a broken line diverting position effective to divert material through the opening 40 and chute 42 onto the cross conveyor 44. In the solid line position, gate 46 seals opening 40 and, because the gate is substantially flush with the wall 38, it enables material to move past it into section 18.

Figure 5:
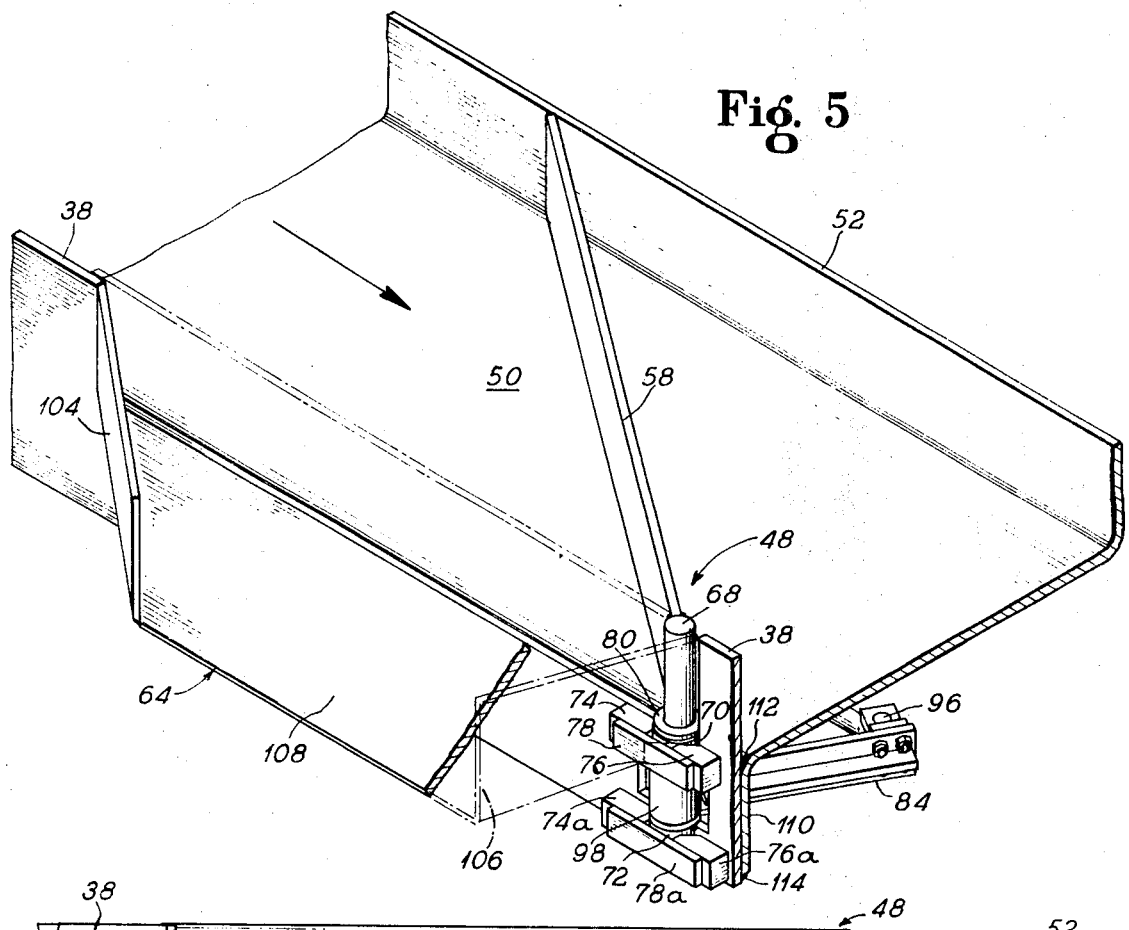

As will be described in connection with FIG. 5 the sidewall 38 is mounted onto a downturned flange extending along the bottom wall 50 and the opposite sidewall 52 comprises an upturned flange extending along the side of the bottom wall 50.

Trough sections 18 and 20 likewise have similar bottom and side walls identified by the same reference number numerals 18, 38 and 52. Trough sections 18 and 20 and are like likewise provided with openings 54 and 56 respectively having corresponding gates 58 and 60 swingable about hinge joints 48 between closed, intermediate, and diverting positions. Gate 58 is shown fully open to divert all material through the opening 54 and into a box 62 by way of chute 64. Gate 60 is closed, shutting off flow through the corresponding chute 66. The hinge joints 48 are preferably on the downstream edge of their corresponding sidewall openings.

FIGS. 3 to 8 show details of diverting gate 58 and power actuating means for moving the gate, it being understood that diverting gates 46 and 60 may be similarly constructed and actuated.

The hinge joint 48 for diverting gate 58 has been selected for description as representative. It is best shown in FIGS. 4 through 8. The gate is welded or otherwise fastened to a hinge pin 68 journaled in vertically spaced sleeves 70 and 72. Upper sleeve 70 is fixed in the wall 38 by blocks 74, 76 and tie bar 78, all welded to the wall and to each other as shown in FIG. 7. Lower sleeve 72 is mounted likewise by blocks 74a, 76a and tie bar 78a as shown in FIG. 8. Preferably, the sleeves 70 and 72 will be alined to support the hinge pin 68 precisely upright before the blocks and tie bars are welded permanently.

A collar 80 is welded or brazed onto the hinge 68 and rests on the top of sleeve 70. This holds the hinge pin 68 and the diverting gate 58 in proper vertical position.

Diverting gate 58 is movable, between diverting and closed positions, by cylinder and piston power means 82 (FIG. 4) operably connected to an actuating arm 84. The cylinder 86 is pivoted on pin 88 carried by mounting block 90 fastened as by bracket 92 on the underside of the trough bottom 50. Piston rod 94 is pivoted on pin 96 at the swingable end of arm 84. The opposite end of arm 84 has a heavy tubular section 98 (FIGS. 5 and 6) embracing the hinge pin and keyed to it at 100 (FIG. 6). Also, as shown in FIG. 6, there is an opening 102 in the sidewall 38 for the heavy tubular section 98. The cylinder 86 may be suitably powered and controlled by conventional valving and a fluid power source not shown.

Were it is necessary to move the diverting gate frequently between one position or another the power means as above described will be advantageous. The other diverting gates 46 and 60 may likewise be power swung. Alternatively, if such movement is infrequent, any particular gate may be swung manually.

Each of the chutes 42, 64 and 66 comprises a pair of angled side chute walls 104, 106 and an outwardly extending bottom or lip 108, preferably welded to the corresponding trough sidewall 38.

An important feature of the present invention is the construction of the trough itself, especially the one wall 38 in which the diverting gate is hinged. This is best shown in FIG. 5. Basically, the cross section is that of an S- or Z- shaped trough with the hinge pin side closed by a flat sidewall. In particular, FIG. 5 shows the bottom wall 50 being integral with an upturned flange comprising the sidewall 52 and a downturned flange 110 comprising reinforcement for the wall 38. The side wall 38 overlaps the downturned flange 110 and is welded to it along lines indicated at 112 and 114. This provides a structurally rigid trough, compensating for any loss of strength in the sidewall 38 due to the opening 40, 54, 56, etc.

Further contributing to rigidity are the joints 22, each comprising a pair of U-shaped flanges 116 connected as by welding to corresponding trough sections and interconnected as by bolts 118.

Figure 1:
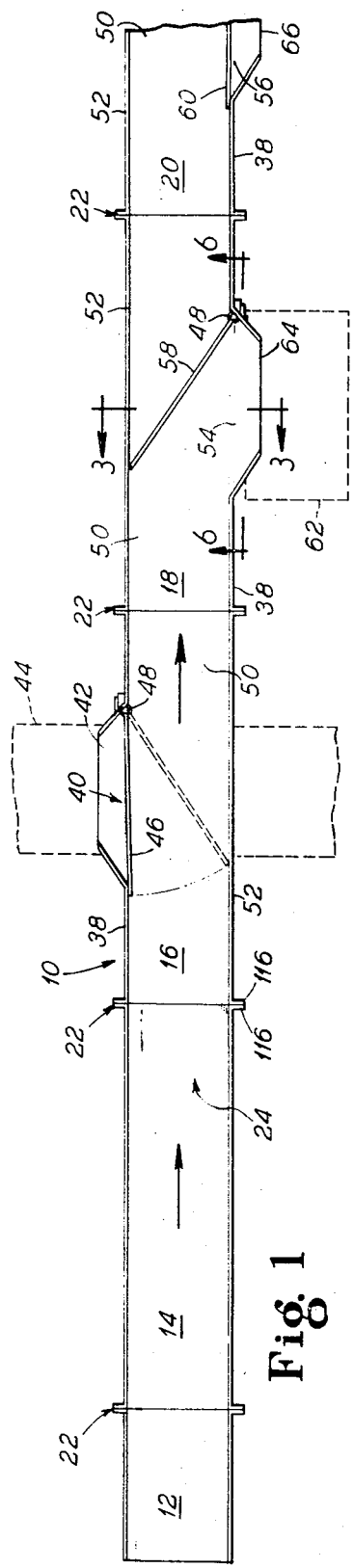
FIG. 1 is a portion of a shaker conveyor trough line incorporating a preferred form of the present invention.
Figure 2:
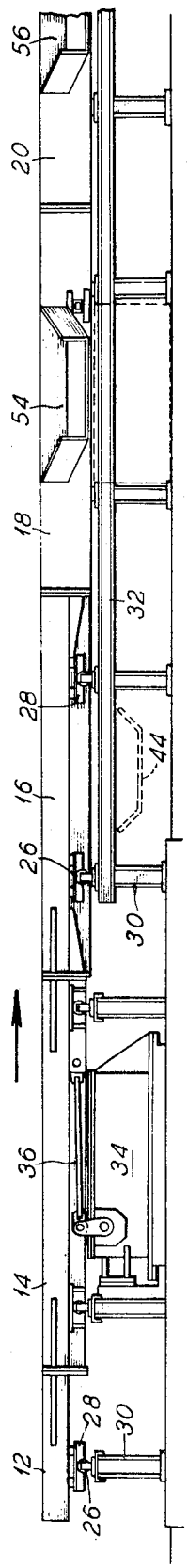
FIG. 2 is a side view of FIG. 1.
Figure 3:
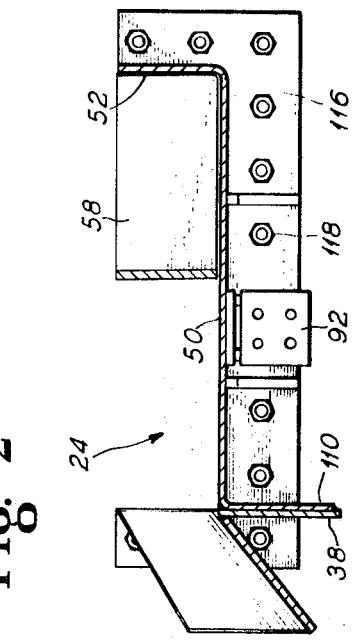
FIG. 3 is a cross section of FIG. 1 taken along the line 3–3.
Figure 4:
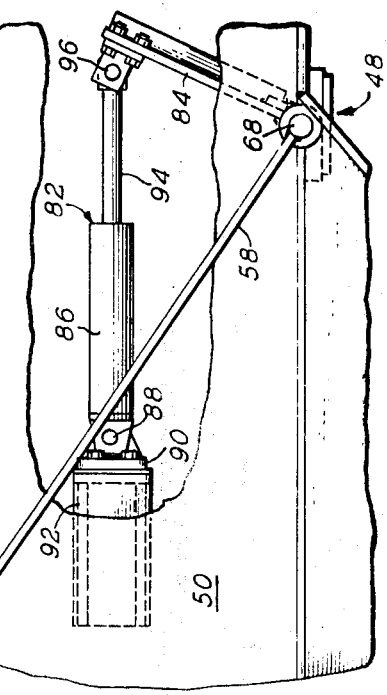
FIG. 4 is an enlarged fragmentary plan view of FIG. 1 with a portion of the trough bottom removed to show one form of power actuating means for one of the diverting gates.

To illustrate the mode of operation, FIG. 1 shows gate 46 closed and comprising a substantial, flatwise continuation of sidewall 38. Material flows past it (in the direction of the arrows) to the gate 58 which is in full diverting position, thereby diverting all the material sidewise through the chute 64 into box 62.

Material can be diverted entirely onto conveyor 44 by moving gate 46 to its broken line diverting position. Material can be diverted partly through chute 42 and the rest through chute 64 by opening gate 46 only part way and leaving gate 58 fully open as shown.

A Another possibility is opening gates 46 and 58 only part way, enabling a portion to be diverted through chutes 42 and 64 with the remainder flowing downstream into section 20 where, at the operator's option, it may continue in a straight line or be diverted through chute 66 depending on the setting of gate 60.

Thus it will be apparent that the present invention has a wide degree of utility in directing material along a shaker conveyor through alternate side openings and chutes or various combinations of them.

I claim:
1. A flow diverting shaker conveyor trough comprising:
   a bottom wall flanked by upstanding marginal side walls defining an elongated, upwardly open channel adapted to guide material longitudinally therealong when conveying motion is imparted to the trough;
   one of the walls having a substantial opening through which material can be selectively diverted;
   a diverting gate in the channel swingably mounted on the trough for movement between closed and diverting positions respectively blocking and enabling flow of material from the channel through the opening;
   power means for swinging the diverting gate between closed and diverting positions, in which the diverting position is obliquely disposed relative to the opening and to the line of motion of material along the channel;
   the diverting gate is hinged to said one wall at the downstream side of the opening; and
   the bottom wall is formed with a downturned, reinforcing flange along at least one edge thereof and said one wall is overlapped and fastened to said flange.

2. A flow diverting shaker conveyor trough according to claim 1 in which the diverting gate is hinged to said one wall by means including an upstanding pivot pin carried by the diverting gate and journaled in the trough's downturned reinforcing flange for turning movement about an upright axis, an actuating arm is carried by the pin below the bottom wall, and cylinder and piston means is mounted below the bottom wall and connected with the actuating arm to move the diverting gate by power between closed and diverting positions.

3. A flow diverting shaker conveyor trough according to claim 1 in which a downwardly inclined discharge chute is supported on the downturned reinforcing flange exteriorly of the opening to direct material transversely away from the trough when the gate is in position to divert material from the channel through the opening.